United States Patent [19]

Baumann

[11] Patent Number: 4,640,828

[45] Date of Patent: Feb. 3, 1987

[54] SEPARATION OF DISSOLVED SUBSTANCES FROM WET PROCESS PHOSPHORIC ACID

[75] Inventor: Arthur N. Baumann, Lakeland, Fla.

[73] Assignee: International Minerals & Chemical Corp., Terre Haute, Ind.

[21] Appl. No.: 790,128

[22] Filed: Oct. 22, 1985

[51] Int. Cl.$^4$ .............................................. C01B 25/16
[52] U.S. Cl. ................................ 423/321 R; 423/158; 423/465
[58] Field of Search ................ 423/321 R, 158, 320, 423/336, 465

[56] References Cited

U.S. PATENT DOCUMENTS

| | | | |
|---|---|---|---|
| 2,987,376 | 6/1961 | Gloss | 423/321 R |
| 3,642,439 | 2/1972 | Moore et al. | 423/158 |
| 4,136,199 | 6/1979 | Mills et al. | 423/321 R |
| 4,215,098 | 7/1980 | Lowe et al. | 423/321 R |
| 4,242,198 | 12/1980 | Hill | 423/321 R |
| 4,243,643 | 6/1981 | Mills | 423/319 |
| 4,248,843 | 2/1981 | Williams et al. | 423/321 R |
| 4,299,804 | 11/1981 | Parks et al. | 423/321 R |
| 4,376,756 | 3/1983 | Mills et al. | 423/317 |
| 4,377,560 | 3/1983 | Ore' | 423/321 R |
| 4,379,776 | 4/1983 | Beer et al. | 423/321 R |
| 4,409,194 | 10/1983 | Petersen | 423/321 R |
| 4,435,372 | 3/1984 | Frazier et al. | 423/321 R |
| 4,554,144 | 11/1985 | Ore | 423/465 |

*Primary Examiner*—Gregory A. Heller
*Attorney, Agent, or Firm*—Wendell R. Guffey; Thomas L. Farquer

[57] ABSTRACT

A process for separating and removing substantial amounts of magnesium and other ion impurities from wet process phosphoric acid of 35–45% $P_2O_5$ content is provided. The process steps comprise: (a) heating the acid while maintaining the acid at a concentration of 35–45% $P_2O_5$ by the addition of water for a time sufficient to effect removal of silicon as fluosilicic acid and/or silicon tetrafluoride, thereby forming a stripped acid; (b) precipitating ralstonite from the heated stripped acid; and (c) separating the precipitated ralstonite from the acid.

23 Claims, 1 Drawing Figure

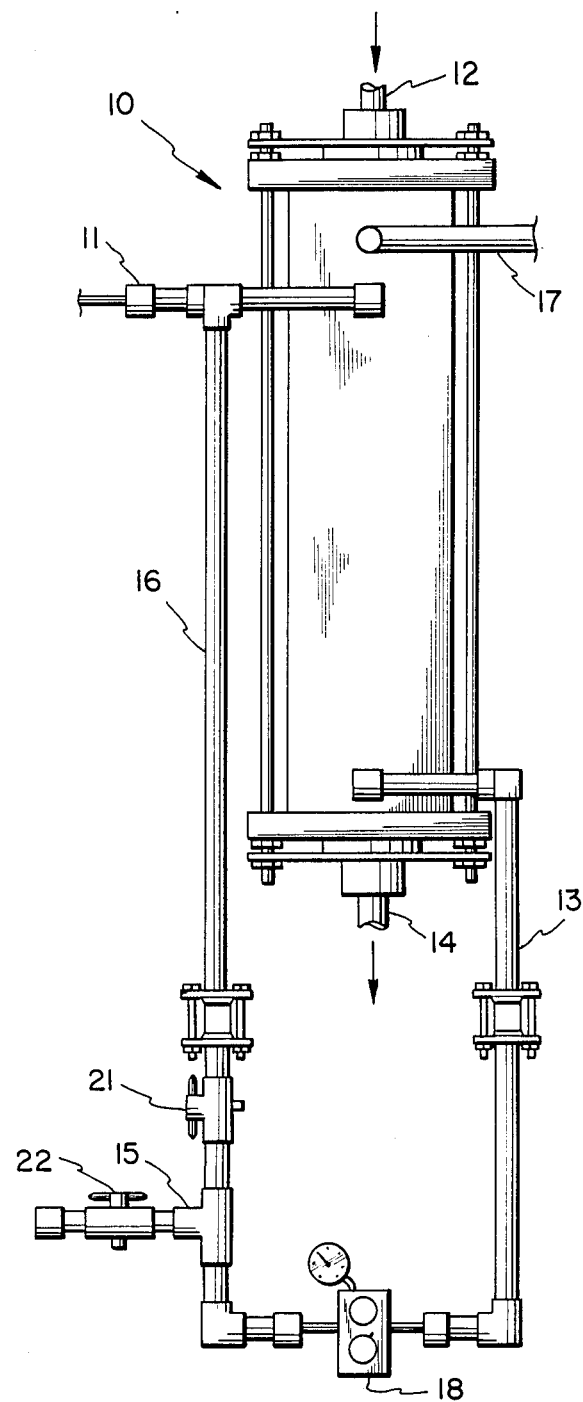

SEPARATION OF DISSOLVED SUBSTANCES FROM WET PROCESS PHOSPHORIC ACID

BACKGROUND OF THE INVENTION

1. Field of the Invention

This invention relates to an improvement in the process for the production of wet process phosphoric acid by separation of dissolved substances. In a particular aspect, this invention relates to a method of separating magnesium, aluminum and fluoride ions, which are present as impurities, from wet process acid.

2. Description of the Prior Art

Wet process phosphoric acid is produced by reacting phosphate rock with sulfuric acid. Phosphate rock is principally composed of tricalcium phosphate and calcium fluoride, but large amounts of contaminating substances are always present. These include silica and metal ions such as iron, aluminium, sodium, calcium and magnesium along with smaller amounts of trace impurities. During the reaction with sulfuric acid, most of the calcium crystallizes as gypsum and is removed by filtration. However, other components form soluble salts which tend to slowly separate during concentration steps, storage and handling.

As is known, crude wet process acid is subjected to a series of purification and concentration steps until a grade having about 54% or more of $P_2O_5$ is reached. This grade, known as merchant acid, is marketed for a variety of uses. Many of the soluble salts remain in the acid after concentration. During storage of the 54% acid, the soluble salts gradually precipitate causing difficulties in handling, shipping and use. For instance, precipitated impurities can result in slime accumulation in storage tanks and other apparatus resulting in reprocessing and cleaning costs and effective reduction in storage capacity. In the case of liquid fertilizers made from wet process phosphoric acid, problems include the clogging of spray orifices and nozzles used to apply the fertilizers, and precipitates which tie up $P_2O_5$ in a form (i.e., citrate insoluble form) that is unavailable to plants. Accordingly, it is desirable to remove as much of the dissolved impurities as possible prior to handling.

Many workers have attempted to solve this problem. W. P. Moore et al., U.S. Pat. No. 3,642,439 discloses separating silicon as $SiF_4$ while evaporating the acid from 35% to 51% $P_2O_5$ and adding aluminum and fluorine ions as needed to maintain optimum ratios for the precipitation of certain complexes. During evaporation, a precipitate consisting of a magnesium-aluminium-fluoride phosphate complex forms and is separated. Unfortunately, a major drawback of the Moore et al. process is the loss of valuable phosphate values in the precipitated complex. Thus, there has been a need in the art for a method of precipitating ion impurities without also precipitating valuable phosphates.

H. E. Mills, U.S. Pat. Nos. 4,136,199 and 4,243,643, discloses removing metal ions by adding calcium and fluorine ions to cause precipitation of a type of ralstonite represented by the formula $Na_xMG_4Al_{2-x}(F, OH)_6 \cdot H_2O$. These patents claim to remove 25-70% of the magnesium and 5-25% of the aluminum impurities.

Richard N. Hill, U.S. Pat. No. 4,242,198, discloses a process using an ion-exchange resin to separate magnesium. K. L. Parks et al., U.S. Pat. No. 4,299,804, discloses adding sufficient fluoride to acid of 25-33% $P_2O_5$ causing precipitation of compounds having a stoichiometry ranging from $MgAl_2F_8$ to $MgAlF$.

A. W. Peterson, U.S. Pat. No. 4,409,194, discloses removing magnesium from super phosphoric acid containing 64-72% $P_2O_5$ by aging the acid for up to 180 hours at a temperature of up to 180° C. with intermittent agitation. These conditions cause formation of a precipitate of $MgH_2P_2O_7$ which can be separated by filtration.

Although these processes have been successful in reducing the concentrations of undesirable ions, they all have various disadvantages such as being too costly, either in terms of energy consumption or equipment costs. Accordingly there is still a need for a better process for separating such ions.

SUMMARY OF THE INVENTION

It is an object of this invention to provide a method for separating substantial amounts of dissolved ion impurities from wet process phosphoric acid.

It is another object of this invention to provide a method for separating substantial amounts of magnesium, aluminum and fluoride ions from wet process phosphoric acid.

These and other objects of this invention, which will become apparent to those skilled in the art from the disclosures herein, are met by a process for separating and removing magnesium and other ion impurities from wet process phosphoric acid of 35-45% $P_2O_5$ content. The process steps comprise (a) stripping silicon from the wet process acid to form a stripped acid; (b) precipitating ralstonite from the heated stripped acid; and (c) separating the precipitated ralstonite from the acid.

BRIEF DESCRIPTION OF THE DRAWING

The sole FIGURE is a side view of a portion of an apparatus which may be used in the method of the present invention.

Although specific forms of apparatus have been selected for illustration of the drawing, and although specific terminology will be resorted to in describing those forms in the specification which follows, it will be understood by those skilled in the art that these are merely representative examples of the present invention and do not limit the scope thereof, which is defined in the appended claims.

DETAILED DESCRIPTION

The process of this invention is based on the surprising discovery that removal of dissolved silicon from acid at about 40% $P_2O_5$ permits the precipitation of the mineral ralstonite which is believed to be represented by one of the formulae $Na_xMg_4Al_2-x(F, OH)_6 H_2O$ or $MgNaAlF_6 \cdot H_2O$. In order to precipitate ralstonite, it is desirable to have sufficient free fluorine (i.e., HF) concentrations in the wet process acid. Unfortunately, if the wet process acid also contains silicon, there is a tendency for the silicon to form complexes with the free fluorine, thereby making the fluorine unavailable for ralstonite formation. By stripping silicon tetrafluoride from the wet process acid, the free fluorine concentration available for ralstonite precipitation increases. Accordingly, stripping silicon from dilute acid permits precipitation of substantial amounts of magnesium and aluminum as ralstonite which can be easily separated. When the acid is later concentrated to the 54% merchant grade, it has a much lesser tendency to develop precipitates during storage and use.

The practice of this invention is generally carried out starting with wet process acid of about 35-45% $P_2O_5$, preferably about 40%. At $P_2O_5$ concentrations above 40% there is a tendency to precipitate valuable phosphates in the form of $M_3KH_{14}(PO_4)_8 \cdot 4H_2O$, wherein M may be either aluminum or iron. On the other hand, at concentrations below about 35% $P_2O_5$, the ralstonite will not easily precipitate. In addition, the settling rate of ralstonite precipitate from wet process acid having a concentration of about 40% $P_2O_5$ is better, due to the acid's lower viscosity.

Water is preferably added to the acid in controlled amounts to compensate for the concentrating effects of the steam evaporation step. Preferably the water added to the acid contains fluorine, more preferably in the range of 0.5-2 wt.%. Gypsum pond water which contains fluorine, may be economically used to reduce the $SiO_2/F$ ratio of the acid, thereby allowing for greater precipitation of ralstonite from the 40% $P_2O_5$ acid.

The acid is often at a temperature of 145°-170° F., but if not, it is heated to within this range, preferably within 150°-160° F. Referring to FIG. 1, the heated acid is fed to a vacuum evaporator 10 through acid feed line 11. The acid is deposited into the interior of vacuum evaporator 10 which is maintained under a negative pressure by vacuum suction line 17. Vacuum evaporator 10 is also provided with a plurality of heat exchange tubes (not shown) fluidly connected between steam inlet line 12 and steam outlet line 14. In this way, steam is pumped through line 12, and further through the plurality of heat exchange tubes running through the interior of evaporator 10 and finally out line 14. The amount and temperature of the steam flowing through lines 12, 14 is controlled to maintain the temperature of the acid in the evaporator 10 within the range of about 145°-170° F., preferably about 150°-160° F. By heating the acid, silicon is volatilized in the form of silicon tetrafluoride and withdrawn through line 17. In addition to silicon tetrafluoride, smaller amounts of hydrofluosilicic acid ($H_2SiF_6$) may also be stripped from the acid and removed through line 17. The silicon compounds volatilized during this stripping may be recovered for other uses or for disposal.

The silicon-stripped acid is then pumped through outlet line 13 by pump 18. The stripped acid is then divided between product line 15 and recycle line 16. The relative amounts of product and recycle may be determined in a known manner by appropriately setting valves 21 and 22. Typically, about 85-95% of the stripped acid is recycled back to the vacuum evaporator 10.

The pressure in the vacuum evaporator 10 is typically maintained within the range of about 20-25 inches $H_2O$, preferably about 23 inches $H_2O$. Since some water is lost from the acid in the vacuum evaporation step, water is preferably added, for example, at a point upstream from acid inlet 11 at a rate sufficient to maintain the concentration of the acid at about 40% by weight $P_2O_5$.

The stripped acid product removed through line 15 is then sent to an agitation tank wherein the acid is gently stirred at a temperature in the range of about 150°-160° F. for a period of time sufficient to allow ralstonite to precipitate, e.g., about 15-25 hours, preferably about 20 hours.

Subsequently, the acid is sent to a heated settling tank which maintains the acid at a temperature in the range of about 150°-160° F. for about 10-15 hours. In the settling tank, large crystals of ralstonite form.

After ralstonite precipitation, the acid may be pumped to any of a number of separating apparatus designed to remove the precipitated ralstonite crystals from the liquid acid. These separation apparatus include centrifuges, filtering apparatus, decantors and others.

The invention will be better understood with reference to the following examples. It is understood, however, that these examples are intended only to illustrate preferred embodiments of the invention and their use is not intended to limit the scope of the invention, which is defined in the appended claims.

EXAMPLE 1

Fifty pounds of wet process acid was concentrated to about 40% $P_2O_5$. A sample of the acid was taken and measured. The measurement data appears in the column labeled Feed of Table 1. The acid was delivered to a Karbate vacuum evaporator. The pressure was reduced to about 23 inches and the contents were heated to 150° F. When steam and fluosilicic acid began to be emitted, 15 lbs. of tap water were fed to the evaporator at an average flow rate of 60 ml/minute. Steam stripping was continued until all the water was introduced. During this time the temperature of the acid varied between 150°-160° F., and the steam temperature varied between 215°-220° F.

When all the water had been added, the acid was removed from the evaporator and placed in a storage container with a mixer. The storage container was placed in a water bath at 150° F. The acid was stirred gently for 20 hours after which time the mixer was turned off. After the agitation was stopped the temperature was maintained, and the precipitate was allowed to settle for 12 hours. A sample was centrifuged and the analysis of the acid appears in the column labeled Product of Table 1.

TABLE 1

|  | Feed | Product |
|---|---|---|
| $P_2O_5$, % wt | 40.46 | 41.69 |
| MgO, % wt | 0.63 | 0.54 |
| F, % wt | 2.13 | 1.20 |
| $SiO_2$, % wt | 0.70 | 0.29 |
| $Al_2O_3$, % wt | 1.46 | 1.32 |
| $MgO/P_2O_5$, lb/lb | 0.0156 | 0.0130 |
| MgO removed, lb | — | 0.0026 |
| MgO removed, % wt | — | 16.7 |

Comparative Example 1

A control test was run following the same procedure performed in Example 1 except that the steam stripping step via water addition was eliminated. The measured data appears in Table 2. Accordingly, no silicon was stripped from the acid. In the absence of silicon stripping, the amount of MgO removed from the acid (column labeled Product) was remarkably lower than Example 1.

TABLE 2

|  | Feed | Product |
|---|---|---|
| $P_2O_5$, % wt | 41.62 | 41.53 |
| MgO, % wt | 0.71 | 0.66 |
| F, % wt | 1.84 | 1.79 |
| $SiO_2$, % wt | 0.80 | 0.77 |
| $Al_2O_3$, % wt | 1.56 | 1.52 |
| $MgO/P_2O_5$, lb/lb | 0.0171 | 0.0159 |
| MgO removed, lb | — | 0.0012 |

TABLE 2-continued

| | Feed | Product |
|---|---|---|
| MgO removed, % wt | — | 7.0– |

EXAMPLE 2

The procedure of Example 1 was again repeated in all essential details except that 10 lbs of gypsum pond water having 1.23% $P_2O_5$, 0.5% $SiO_2$ and 0.86% F (all by weight), was substituted for the tap water. The pond water flow rate averaged about 50 ml/min. The analyses of the feed and product acids are presented in Table 3.

TABLE 3

| | Feed | Product |
|---|---|---|
| $P_2O_5$, % wt | 40.94 | 42.52 |
| MgO, % wt | 0.65 | 0.55 |
| F, % wt | 2.31 | 1.50 |
| $SiO_2$, % wt | 0.83 | 0.50 |
| $Al_2O_3$, % wt | 1.54 | 1.40 |
| $MgO/P_2O_5$, lb/lb | 0.0158 | 0.0129 |
| MgO removed, lb | — | 0.0029 |
| MgO removed, % wt | — | 18.4 |

I claim:

1. A method of removing magnesium, aluminum, sodium, and fluoride ion impurities from wet process phosphoric acid containing dissolved silicon comprising the steps of:
   (a) stripping at least a portion of the dissolved silicon from the wet process phosphoric acid having a $P_2O_5$ concentration of about 35–45% by heating the acid to a temperature where steam evaporation occurs while maintaining the pressure constant and adding $H_2O$ to keep the concentration within the 34–45% range;
   (b) precipitating ralstonite from the stripped acid; and
   (c) separating the precipitated ralstonite from the stripped acid.

2. The method as defined in claim 1, wherein step (a) comprises heating the acid at reduced pressure.

3. The method as defined in claim 2, wherein step (a) comprises heating the acid to a temperature in the range of about 145°–170° F.

4. The method as defined in claim 3, wherein the temperature is preferably in the range of about 150°–160° F.

5. The method as defined in claim 1, wherein the acid is maintained at about 35–45% $P_2O_5$ by adding water to the acid.

6. The method as defined in claim 3, wherein the reduced pressure is in the range of about 20–25 inches $H_2O$.

7. The method as defined in claim 6, wherein the reduced pressure is preferably about 23 inches $H_2O$.

8. The method as defined in claim 1, wherein the stripped silicon comprises silicon tetrafluoride.

9. The method as defined in claim 1, wherein step (b) comprises agitating the stripped acid at an elevated temperature for about 15–25 hours.

10. The method as defined in claim 9, wherein the elevated temperature is in the range of about 150°–160° F.

11. The method as defined in claim 9, wherein the stripped acid is preferably agitated for about 20 hours.

12. The method as defined in claim 1, wherein the precipitated ralstonite is allowed to settle by maintaining the stripped acid at an elevated temperature for a period of time without agitation.

13. The method as defined in claim 12, wherein the elevated temperature is in the range of about 150°–160° F.

14. The method as defined in claim 12, wherein the period of time without agitation is about 10–15 hours.

15. The method as defined in claim 1, wherein step (c) comprises filtrating the ralstonite from the acid.

16. The method as defined in claim 1, wherein step (c) comprises centrifuging the ralstonite from the acid.

17. The method as defined in claim 1, wherein step (c) comprises decanting the ralstonite from the acid.

18. The method as defined in claim 1, wherein the stripped silicon comprises $SiF_4$.

19. The method as defined in claim 1, wherein the stripped silicon comprises hydrofluosilicic acid.

20. A method of removing magnesium, aluminum, sodium, and fluoride ion impurities from wet process phosphoric acid containing dissolved silicon comprising the steps of:
   (a) stripping at least a portion of the dissolved silicon from the wet process phosphoric acid having a $P_2O_5$ concentration of about 35–45% by heating the acid to a temperature from about 145°–170° F. while maintaining the pressure from about 20–25 inches $H_2O$;
   (b) precipitating ralstonite from the stripped acid by agitating the stripped acid at a temperature from about 145°–170° F. for about 15–25 hours; and
   (c) separating the precipitated ralstonite from the stripped acid.

21. A method of removing magnesium, aluminum, sodium, and fluoride ion impurities from wet process phosphoric acid containing dissolved silicon comprising the steps of:
   (a) stripping at least a portion of the dissolved silicon from the wet process phosphoric acid having a $P_2O_5$ concentration of about 35–45% by heating the acid to a temperature from about 145°–170° F. while maintaining the pressure from about 20–25 inches $H_2O$;
   (b) precipitating ralstonite from the stripped acid by allowing the precipitated ralstonite to settle for a period of time without agitation while maintaining the stripped acid at a temperature from about 145°–170° F.; and
   (c) separating the precipitated ralstonite from the stripped acid.

22. The method as defined in claim 20, wherein step (c) comprises a method selected from the group consisting of filtration, centrifugation, and decantation.

23. The method as defined in claim 21, wherein step (c) comprises a method for separating the precipitated ralstonite selected from the group consisting of filtration, centrifugation, and decantation.

* * * * *